S. T. Sanford,
Fruit Cutter and Corer.
N°. 39,963. Patented Sep. 15, 1863.
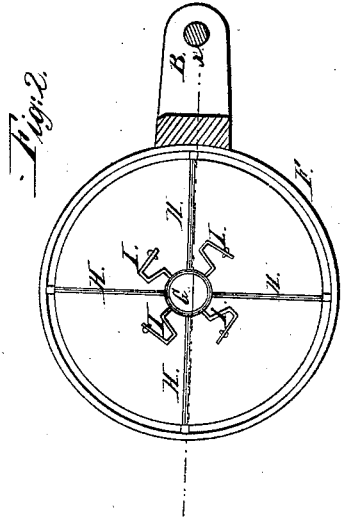
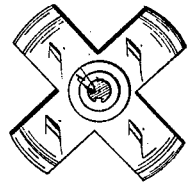
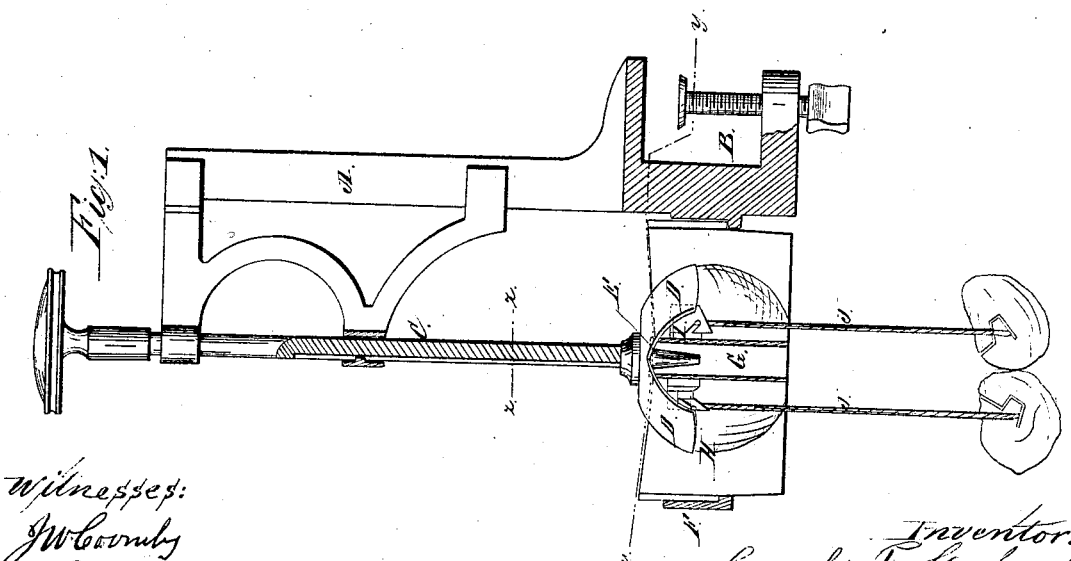

UNITED STATES PATENT OFFICE.

SAMUEL T. SANFORD, OF FALL RIVER, MASSACHUSETTS.

IMROVED DEVICE FOR QUARTERING, CORING, AND STRINGING FRUIT.

Specification forming part of Letters Patent No. 39,863, dated September 15, 1863.

*To all whom it may concern:*

Be it known that I, SAMUEL T. SANFORD, of Fall River, in the county of Bristol and State of Massachusetts, have invented a new and useful Device for Quartering, Coring, and Stringing Apples and other Fruit; and I do hereby declare that the following is a full, clear, and exact description of the same, reference being had to the accompanying drawings, making a part of this specification, in which—

Figure 1 is a side sectional view of my invention, taken in the line $x\ x$, Fig. 2. Fig. 2 is a horizontal section of the same, taken in the line $y\ y$, Fig. 1; Fig. 3, a horizontal section of the same, taken in the line $z\ z$, Fig. 1.

Similar letters of reference indicate corresponding parts in the several figures.

This invention consists in the employment or use of a sliding rod provided with curved arms and a spur, in connection with quartering-knives and a core-cutter, the latter having bent or zigzag cutters attached to it, to which strings are secured, all being arranged in such a manner that the apple or fruit, after being pared, may be quartered, cored, and strung, ready for drying, the whole work being done simultaneously or at one operation.

The invention is an improvement on a device which was patented by me February 17, 1863, for stringing fruit.

The device herein described facilitates in a much greater degree the preparation of fruit for drying, the latter being quartered and cored simultaneously with the stringing operation.

To enable others skilled in the art to fully understand and construct my invention, I will proceed to describe it.

A represents an upright, the lower part of which is provided with a clamp, B, to secure the upright to any suitable fixture. To the upright A there are secured two lateral arms, in which a vertical rod, C, is fitted and allowed to slide freely. The lower end of this rod has four curved arms, D, projecting radially from it, the curvature of the arms forming a sort of cap to project over the apple or other article to be operated upon, and at the center of the arms D there is a point or spur, E, on which the apple is secured centrally. To the lower part of the upright A there is attached a horizontal ring, F, in which the quartering and coring device is fitted. These parts are connected together so as to form one piece. The coring device is formed of a tube, G, sharpened at its upper end and of sufficient diameter to take out the cores of the fruit, and the quartering device is composed of four cutters, H, formed of flat blades attached vertically and radially to the tube G, at equal distances apart. The tube or coring device G is in line with the rod C, as shown clearly in Fig. 1, and to the tube G there are attached four cutters, I, which are of zigzag form and have each a string, J, attached to them. There is a cutter, I, in each space between the cutters H, and the cutters I are constructed in the same way as the one shown in my patented device previously referred to.

The operation is as follows: The apple or other article to be operated upon is centered on the point or spur E of the rod C, the core of the apple being in line with the tube G, and when the apple is thus centered the rod is forced down by striking its upper end with the hand, the apple being thereby forced down upon the tube G and cutters H, the former taking out the core of the apple and the cutters H quartering it, the quarters or pieces at the same time being forced down upon the cutters I and upon the strings J, one apple as it is quartered forcing down the pieces of the apple previously quartered upon the strings. Thus it will be seen that the quartering, coring, and stringing operations are performed simultaneously or at one operation, and the whole work consequently may be done very expeditiously.

I do not claim any of the cutters, separately or in themselves considered. The quartering and coring devices have been used in apple-paring machines, and a stringing-cutter constructed as those herein described may be seen in the device formerly patented by me and previously alluded to.

I claim, therefore, as new and desire to secure by Letters Patent—

The coring device G, quartering-cutters H, and stringing-cutters I, arranged as shown, in combination with the sliding rod C, provided with the point or spur E and curved arms D, the above parts being connected or applied to a suitable upright or support, A, and all arranged substantially as herein set forth.

SAMUEL T. SANFORD.

Witnesses:
HEZEKIAH L. DROWN,
HANNAH M. DROWN.